United States Patent
Leo

(10) Patent No.: US 7,383,208 B2
(45) Date of Patent: Jun. 3, 2008

(54) METHOD FOR LABELING, PACKAGING AND SELLING GIFT ITEM

(76) Inventor: Artil A. Leo, 31049 Dequindre, Madison Heights, MI (US) 48071

(*) Notice: Subject to any disclaimer, the term of this patent is extended or adjusted under 35 U.S.C. 154(b) by 686 days.

(21) Appl. No.: 10/453,986

(22) Filed: Jun. 4, 2003

(65) Prior Publication Data

US 2003/0236715 A1 Dec. 25, 2003

Related U.S. Application Data

(60) Provisional application No. 60/386,028, filed on Jun. 5, 2002.

(51) Int. Cl.
*G06Q 30/00* (2006.01)
(52) U.S. Cl. .......................................... 705/26; 705/37
(58) Field of Classification Search .................... 705/26
See application file for complete search history.

(56) References Cited

U.S. PATENT DOCUMENTS

| 6,755,350 B2* | 6/2004 | Rochford et al. ............. 239/34 |
| 6,760,638 B1* | 7/2004 | Love et al. .................... 700/98 |
| 6,937,997 B1* | 8/2005 | Parulski ....................... 705/26 |
| 6,965,912 B2* | 11/2005 | Friedman et al. ............ 709/203 |

OTHER PUBLICATIONS

"Packaging" by an anonymous author, Step-by-Step Graphics. Peoria: Mar./Apr. 2001. vol. 17, Iss. 2; p. 88, 12 pgs, Downloaded from the Internet on Jan. 22, 2008.*

* cited by examiner

*Primary Examiner*—James Zurita
(74) *Attorney, Agent, or Firm*—Gifford, Krass, Sprinkle, Anderson & Citkowski, P.C.

(57) ABSTRACT

This invention provides a method and apparatus for selling a gift item, particularly at the point of sale. The method allows the purchaser to generate a custom designed label and optional gift card for a selected gift item. The method is described with particular reference to the packaging and sale of beverages such as wine.

4 Claims, 1 Drawing Sheet

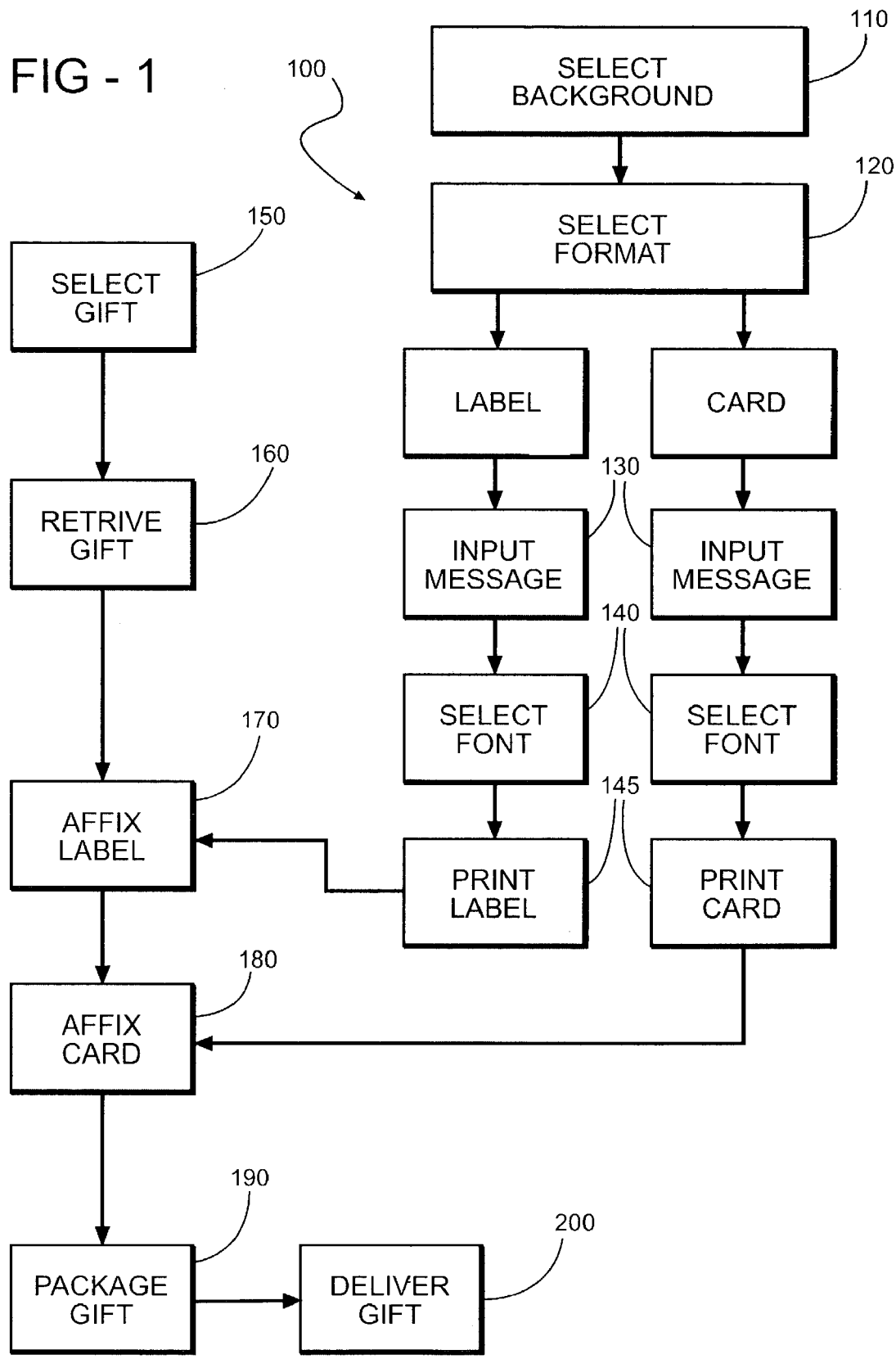

METHOD FOR LABELING, PACKAGING AND SELLING GIFT ITEM

RELATED APPLICATION

This application claims the benefit of U.S. Provisional Application No. 60/386,028, filed Jun. 5, 2002.

FIELD OF THE INVENTION

This invention relates generally to a method for selling a gift item, which method allows the purchaser to generate a custom designed label and optional gift card for the item. The method is described with particular reference to the packaging and sale of beverages such as wine.

BACKGROUND OF THE INVENTION

It is well known in the industry to custom label gift and promotional items with user selected messages and designs. In this regard, custom labels are designed and generated through the use of commercial printing presses and other graphic arts equipment. The prior art processes are not readily adaptable for generating relatively small runs of labels, and are impractical for preparing individual labels. In addition, the use of such prior art equipment generally requires specialized training. All of these factors preclude the use of prior art printing equipment for the point-of-purchase generation of customized labels, cards and packaging materials by consumers.

SUMMARY OF THE INVENTION

The present invention provides a method for allowing consumers to custom label and package a gift item at a point of sale thereby personalizing and enhancing the gift giving experience.

The method for generating a custom label includes a first step of providing a programmed computer having a first database that includes a plurality of background designs stored therein; a second database having at least one label format; a third database encoding a plurality of type fonts; a graphic arts program; an input device and a printer in communication with an output of the computer.

The method continues by permitting a user to enter data into the computer for the customization of the label. The customization may begin with the user selecting a first one of a plurality of background designs. The user may then continue customization by selecting a label format and thereafter using the input device for entering text for the label message into the graphic arts program.

The process continues with the user selecting a label type font and then integrating each of the selected background design, label format, label type font and input text into the graphic arts program so as to generate an output data stream to the printer which thereafter prints a user readable label displaying the selected background design, label format, label type font and label message. The labeling process is facilitated by the point of sale merchant maintaining a full stock of gift items whereby a user selects a gift item from the merchant's stock. The selected gift item is retrieved from stock and the custom label is affixed thereto and packaged for delivery to the recipient.

BRIEF DESCRIPTION OF THE DRAWINGS

A better understanding of the present invention will be had upon reference to the following detailed description when read in conjunction with the accompanying drawings in which like parts are given like reference numerals and wherein:

FIG. 1 is a flow diagram of the method for creating a customized labeling and card for a gift item as according to the invention.

DETAILED DESCRIPTION OF THE INVENTION

In accord with the present invention, and as will be explained in greater detail hereinbelow, the present invention is directed to a method and apparatus which will allow a customer to generate a customized label for a gift item.

The customized label will include a customer-selected message in a preselected font together with one or more background designs. Additionally, a customer may be permitted to generate a customized greeting card in a design corresponding to the label. The invention may further be employed to generate customized wrapping paper, gift boxes or other packaging materials.

The system of the present invention is based upon a user-friendly computer program operating in connection with an input device such as a touch screen and a high quality printer. It is appreciated that allowing a customer to customize the labeling and/or packaging of a gift item may serve to increase the value of the gift item both for the customer and for the recipient.

The invention is particularly well suited for use in the point of sale labeling and packaging of specialty gift items such as foods and beverages, and it has particular advantage for generating custom labels for wine bottles. However, it is to be understood that the principles of the present invention may be readily adapted to any application in which custom labeling of a product is desired.

The inventive method of customizing a labeling and/or packaging for a gift item allows a customer to select a gift item, and thereafter generate one or more labels which are to be affixed to that item. The labels can include a customer-selected message, and this message may include the name of the gift giver and/or the name of the recipient and/or a description of the gift item, as well as a personal message from the giver to the recipient. The customer is allowed to select the type font of the message as well as the format and background design of the label.

In a further embodiment of the present invention, the customer may also generate a greeting card that includes one or more text messages as well as design elements. The greeting card can be selected to correspond to, or otherwise complement, the label.

The present invention will be described with reference to one embodiment that involves the labeling of a gift item, and the packaging of the labeled gift item with a corresponding gift card. A flow diagram for this method is shown in the FIG. 1.

As mentioned above, the method 100 is most preferably carried out utilizing a programmed computer which comprises a graphic arts program and includes a first database having a plurality of background designs; a second database having at least one label format; a third database having a plurality of type fonts; and, optionally, a fourth database which includes a plurality of greeting card formats.

The computer also includes a graphic arts program, an input device and a printer in communication therewith. The input device is most preferably a touch screen, keypad, mouse, touch pad or the like. However, it is appreciated that other input methods can be employed which may illustratively include voice synthesis, handwriting and/or text recognition. Illustratively, a touch screen input device would permit the user to select and/or move objects, such as text or graphics, around the label landscape by simply using a finger thus providing a level of user friendliness to the consumer.

The computer can comprise a conventional personal computer, laptop computer, tablet computer, or the like although the invention may be implemented through the use of a dedicated, purpose-built computer or kiosk. The printer is most preferably a high quality color printer that employs waterproof inks.

In a first step 110 of the invention, a user selects a background design from a plurality of designs resident in the first database of the computer. The background design may include digital photographs, drawings or other graphic images that will be used to generate a label and/or greeting card. Alternatively, a user may input a background design image from an external source such as a scanner, video diskette, magnetic disk, CDR or the like. In this manner, a user may provide a personal and unique design for use in the system.

In a second step 120 of the invention, the user selects a specific format, such as a label format or card format, to which the background design will be applied. The label and card formats are stored in the second computer database as templates.

In a subsequent step 130, the user inputs a message into the computer. The message typically will comprise a text message such as a personal greeting and/or the name of the recipient of the gift and/or the name of the person giving the gift. In those instances where a card format is selected, a message which is the same as the label message, or different therefrom, is also input.

In a further step 140, a message font is selected from a plurality of typeface fonts stored in the third computer database. The graphic arts program operating in the computer integrates the background data, format data, message data, and font data so as to generate an output signal that is communicated to the printer so as to cause the printer to generate a label and/or a gift card.

According to the method 100 of the present invention, the user also selects a gift item 150, which is retrieved from storage 160. The selection 150 and retrieval 160 can be accomplished manually or through the use of a computer, which may be the same computer used for generating and printing labels and cards 145, or it may be a different computer.

The custom printed label is affixed to the gift item 170, and if a card is generated, the card is also be affixed to the item 180. The item is then packaged 190 and delivered 200 to the recipient. It is to be understood that the various steps described herein need not be carried out in the sequence in which they were described. It is appreciated that the user is permitted to select a desired number of copies and color scheme for the chosen label or card design. Further, the user may be allowed to register his or her name in the system for future gift giving occasions. Also, the method 100 may be further operational to generate custom designed wrapping paper, gift boxes, mailing labels, personal and/or business stationery and the like.

It will be appreciated that the present invention is particularly well adapted for providing customized gifts for occasions such as anniversaries, weddings, birthdays, housewarmings, holidays and the like. The invention may also be adapted for the labeling and packaging of business gifts and other promotional or commemorative items. Also, while the items being labeled are described herein as gifts, the invention is not so limited, since persons may have interest in labeling items purchased for their own use with custom labels. For example, a person may wish to custom label wines or the like, for personal consumption, with a private label.

As detailed above, the present invention may be used with advantage in connection with the manufacture and sale of wines as practiced by a small winery. In accord with another feature of the present invention, there is provided a system for manufacturing wine, and this system greatly minimizes the moving and handling of liquids.

In accord with this additional feature, a fermenter vessel, which is typically a relatively large capacity vessel, such as a 10 to 100 gallon capacity vessel, is supported at a first height above a work surface, as for example by a rack, shelf or the like. A secondary vessel, such as a settling tank, aging tank or the like, is supported at a second height above the work surface, and this second height is less than the first height. In this manner, gravity may be readily employed to transfer liquid from the first, primary fermenting vessel to the secondary vessel, without the use of pumps or the like.

This additional system feature further includes a trolley hoist that is operable to engage the secondary vessel and move it along a first path of travel that is perpendicular to the work surface and a second path of travel that is parallel to the work surface. Inclusion of the trolley allows this system feature to accommodate a plurality of secondary vessels which may be stored at various locations, and at various heights above the work surface.

In using of this system feature, a secondary vessel may be moved by the trolley hoist to a position at the second height above the work surface, and liquid is thereafter transferred from the primary vessel to the secondary vessel by gravity. The secondary vessel is then returned to a storage location, and another secondary vessel is moved to a position beneath the primary vessel. The trolley hoist is most preferably electrically powered.

It is to be understood that the foregoing discussion and description are illustrative of particular embodiments of the invention, but are not meant to be limitations upon the practice thereof. It is the following claims, including all equivalents, which define the scope of the invention.

The invention claimed is:

1. A method for custom labeling a wine bottle, said method comprising the steps of:
   providing a computer comprising:
   a first database having a plurality of background designs of wine bottle labels;
   a second database having at least one wine bottle label format;
   a third database having at least one type font;
   a graphic arts program operative to integrate objects of the first, second and third databases onto the wine bottle label;
   an input device for permitting a user to enter data into the computer; and
   a printer in communication with the computer;
   using the input device to select at least one background design of a wine bottle label from the first database;
   using the input device to select at least one wine bottle label format from the second database;
   using the input device to input text for a label message into the computer;
   using the input device to select a label type font;
   integrating the selected at least one background design of a wine bottle label, at least one bottle label format, at least one label type font and the label message using the graphic arts program so as to create a printable label data file;

printing a user readable label from the printable label data file; and affixing the user readable label to the wine bottle.

2. The method of claim 1 further comprising the steps of:

providing the computer with a fourth database having at least one card format;

selecting at least one card format;

selecting at least one background design for the card;

inputting text for a card message into the computer;

selecting a type font for the card;

integrating the card format, type font, background design and card message so as to create a printable card data file;

printing a user readable card from the printable card data file;

packaging the user readable card with the wine bottle.

3. The method of claim 2 wherein the card design and card type font are the same as the label design and label type font of the wine bottle.

4. The method of claim 1 wherein said input device comprises a touch screen.

* * * * *

UNITED STATES PATENT AND TRADEMARK OFFICE
CERTIFICATE OF CORRECTION

PATENT NO. : 7,383,208 B2  
APPLICATION NO. : 10/453986  
DATED : June 3, 2008  
INVENTOR(S) : Artil A. Leo It is certified that error appears in the above-identified patent and that said Letters Patent is hereby corrected as shown below:

Column 4, line 46, after "computer" insert --at a point-of-sale-location--

Column 4, after line 57, insert --allowing a user to perform the following operations at the point-of-sale location using the input device--

Column 4, line 58, delete "using the input device to"

Column 4, line 60, delete "using the input device to"

Column 4, line 62, delete "using the input device to"

Column 4, line 63, after "computer;" insert --and--

Column 4, line 64, delete "using the input device to"

Column 5, line 2, after "a" insert --personalized and unique--

Column 5, line 3, after "file" insert --for that user--

Column 5, line 4, replace "user readable" with --personalized and unique--

Column 5, line 6, after "bottle" insert --at the point-of-sale location--

Signed and Sealed this

Fourteenth Day of October, 2008

JON W. DUDAS  
*Director of the United States Patent and Trademark Office*